United States Patent
Tian et al.

(10) Patent No.: US 8,931,700 B2
(45) Date of Patent: Jan. 13, 2015

(54) FOUR DIMENSIONAL (4D) COLOR BARCODE FOR HIGH CAPACITY DATA ENCODING AND DECODING

(75) Inventors: Yibin Tian, Menlo Park, CA (US); Wei Ming, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 13/336,627

(22) Filed: Dec. 23, 2011

(65) Prior Publication Data

US 2013/0161395 A1    Jun. 27, 2013

(51) Int. Cl.
*G06K 19/00*    (2006.01)

(52) U.S. Cl.
USPC .. 235/462.04; 235/435; 235/439; 235/462.01

(58) Field of Classification Search
USPC ..................................................... 235/462.04
See application file for complete search history.

(56) References Cited

U.S. PATENT DOCUMENTS

| | | | |
|---|---|---|---|
| 5,869,828 A | 2/1999 | Braginsky | |
| 6,915,011 B2 | 7/2005 | Loui et al. | |
| 6,981,644 B2 | 1/2006 | Cheong et al. | |
| 7,478,746 B2 | 1/2009 | Cattrone | |
| 7,533,817 B2 | 5/2009 | Ming et al. | |
| 7,751,585 B2 | 7/2010 | Jancke | |
| 8,006,911 B2 | 8/2011 | Yi et al. | |
| 8,047,447 B2 | 11/2011 | Bulan et al. | |
| 2005/0023354 A1* | 2/2005 | Sali et al. | 235/462.04 |
| 2007/0278303 A1* | 12/2007 | Cattrone | 235/462.1 |
| 2010/0034468 A1* | 2/2010 | Boncyk et al. | 382/217 |
| 2010/0282851 A1 | 11/2010 | Bulan et al. | |
| 2011/0186632 A1* | 8/2011 | Yi et al. | 235/437 |
| 2013/0157760 A1 | 6/2013 | Boudville | |
| 2013/0161395 A1 | 6/2013 | Tian et al. | |

* cited by examiner

*Primary Examiner* — Matthew Mikels
(74) *Attorney, Agent, or Firm* — Chen Yoshimura LLP

(57) ABSTRACT

A method and program for encoding and decoding color barcodes to increase their data capacity. The encoding steps include determining a shape and a color for each data cell to encode digital data, wherein a combination of the shape and the color for the data cell is chosen from a plurality of combinations of shapes and colors in accordance with a value of the digital data to be encoded, and coloring a subset of the plurality of pixels in each data cell in accordance with the shape and the color for the data cell determined above. The decoding steps include segmenting the data cells in a color barcode, recognizing a shape formed by a subset of pixels in each data cell and the color of the shape, and obtaining digital data from a combination of the recognized shape and color in each data cell.

20 Claims, 5 Drawing Sheets

FOUR DIMENSIONAL (4D) COLOR BARCODE FOR HIGH CAPACITY DATA ENCODING AND DECODING

BACKGROUND OF THE INVENTION

1. Field of the Invention

This invention generally relates to color barcodes type of machine-readable symbology for encoding digital data, and more particularly, it relates to a method for increasing the data capacity of color barcodes for high capacity data encoding and decoding.

2. Description of the Related Art

Color barcodes are a type of machine-readable symbology for recording digital data. Conventional one-dimensional and two-dimensional black and white barcodes are widely used. Recently color barcodes have also been introduced to increase the data capacity of the barcodes, one more "dimension" being added to the barcodes in addition to the intensity of light reflection to represent additional data, and are often referred to as "three dimensional (3D)" barcodes. For example, U.S. Pat. Nos. 7,478,746, 7,533,817, 7,751,585 and 8,006,911 proposed various ways of encoding data with color barcodes. Due to relatively poor color reproducing fidelity during the printing and imaging process, the number of colors that can be used in a given barcode is limited. Thus additional measures should be taken to further increase the data capacity of color barcodes. U.S. Pat. No. 7,751,585 utilized color triangles instead of conventional rectangles/squares to reduce barcode size and thus increase its data capacity; U.S. Pat. No. 8,047,447 suggested to use printer halftone dot orientations of each of the primary printing color channels to increase the amount of encoded data.

Color printers are typically used to produce color barcodes on recoding media such as paper, transparency, plastic sheet, fabric, etc. Color printers generally use toning materials, such as color inks and toner particles, of the subtractive colors, i.e., cyan (C), magenta (M) and yellow (Y). These colors (C, M and Y), together with black (K), are usually referred to as the CMYK colors or the CMYK color space. To a certain extent, colors printed by a printer depend on the characteristics of the toning material sets used by the printer.

Oftentimes color barcodes may be displayed on a color display device such as a cathode ray tube (CRT) monitor, a liquid crystal display (LCD) monitor, etc. Color displays generally use display pixels having additive colors, i.e., red (R), green (G) and blue (B). These colors (R, G and B) are usually referred to as the RGB colors or the RGB color space.

In addition, a color scanner, camera or other detecting device is often used to scan or read a color barcode. A color scanner or detector typically uses a set of color filters (e.g. RGB filters) to detect the color of the received light.

With the increased use of barcodes and the advancement in technology that enhanced the resolution of color printers, displays and scanners, it is desirable to introduce new ways for increasing the data capacity of color barcodes for high capacity data encoding and decoding.

SUMMARY OF THE INVENTION

The present invention is directed to a method for increasing the data capacity of color barcodes for high capacity data encoding and decoding.

An object of the present invention is to provide color barcodes that have enhanced data capacity by using various combinations of colors and shapes in the barcodes to encode additional digital data.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, one exemplary embodiment of the present invention provides a method for encoding digital data in a color barcode having a plurality of cells including data cells, comprising the steps of: (a) determining a shape and a color for each data cell to encode digital data, wherein a combination of the shape and the color for the data cell is chosen from a plurality of combinations of shapes and colors in accordance with a value of the digital data to be encoded in the data cell; and (b) coloring, for each data cell, a subset of the plurality of pixels in the data cell in accordance with the shape and the color for the data cell determined in step (a).

In another aspect, one exemplary embodiment of the present invention provides a method for decoding a color barcode, comprising the steps of: (a) segmenting a plurality of data cells in the color barcode; (b) recognizing a shape formed by a subset of pixels in each data cell, and a color of the shape; and (c) obtaining digital data from a combination of the recognized shape and color in each data cell.

In yet another aspect, one exemplary embodiment of the present invention further provides a computer program product comprising a computer usable non-transitory medium (e.g. memory or storage device) having a computer readable program code embedded therein for controlling a data processing apparatus, the computer readable program code configured to cause the data processing apparatus to execute a process for encoding digital data in a color barcode, which process includes the steps of: (a) determining a shape and a color for each data cell to encode digital data, wherein a combination of the shape and the color for the data cell is chosen from a plurality of combinations of shapes and colors in accordance with a value of the digital data to be encoded in the data cell; and (b) coloring, for each data cell, a subset of the plurality of pixels in the data cell in accordance with the shape and the color for the data cell determined in step (a).

In still another aspect, one exemplary embodiment of the present invention further provides a computer program product comprising a computer usable non-transitory medium (e.g. memory or storage device) having a computer readable program code embedded therein for controlling a data processing apparatus, the computer readable program code configured to cause the data processing apparatus to execute a process for decoding a color barcode, which process includes the steps of: (a) segmenting a plurality of data cells in the color barcode; (b) recognizing a shape formed by a subset of pixels in each data cell, and a color of the shape; and (c) obtaining digital data from a combination of the recognized shape and color in each data cell.

It is to be understood that both the foregoing general description and the following detailed description are exemplary and explanatory and are intended to provide further explanation of the invention as claimed.

BRIEF DESCRIPTION OF THE DRAWINGS

FIGS. 2(a) through 1(h) are diagrams illustrating the various exemplary colors used for the data cells of a color barcode according to an embodiment of the present invention.

DETAILED DESCRIPTION OF THE PREFERRED EMBODIMENTS

Figure 1A:
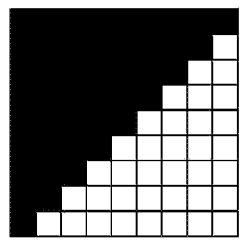
FIGS. 1(a) through 1(j) are diagrams illustrating the various exemplary shapes used for the data cells of a color barcode according to an embodiment of the present invention.
Figure 1B:
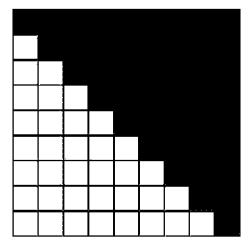
Figure 1C:
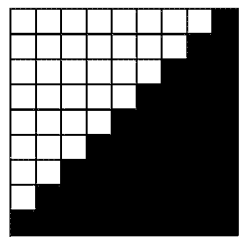
Figure 1D:
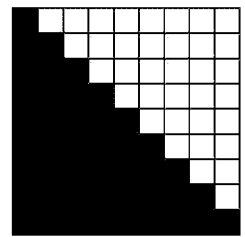
Figure 1E:
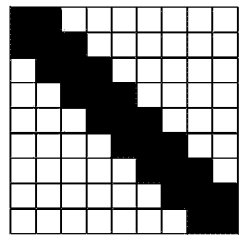
Figure 1F:
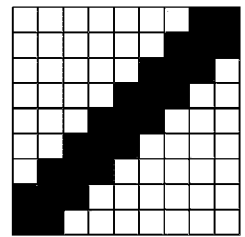
Figure 1G:
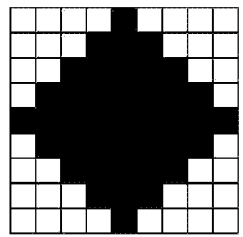
Figure 1H:
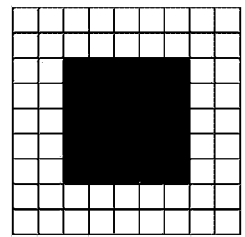
Figure 1I:
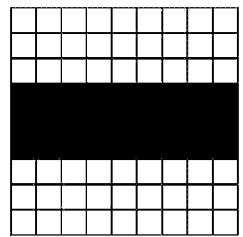
Figure 1J:
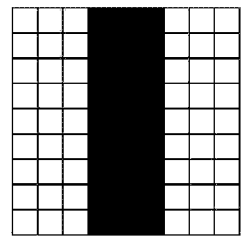
Figure 2A:
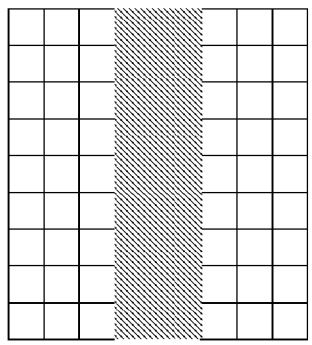
Figure 2B:
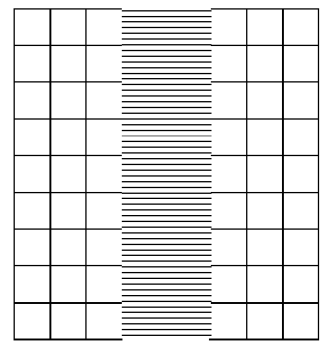
Figure 2C:
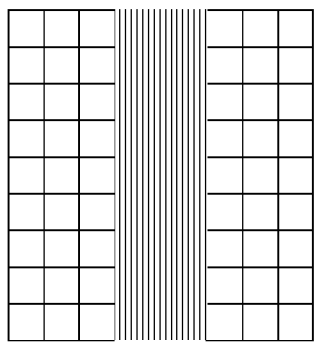
Figure 2D:
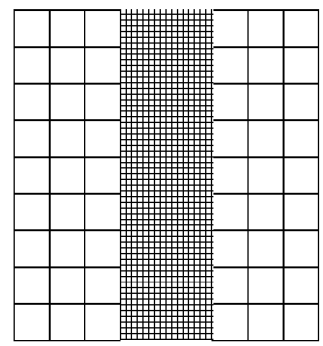
Figure 2E:
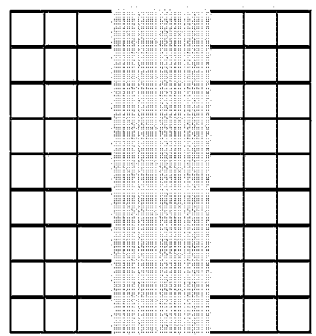
Figure 2F:
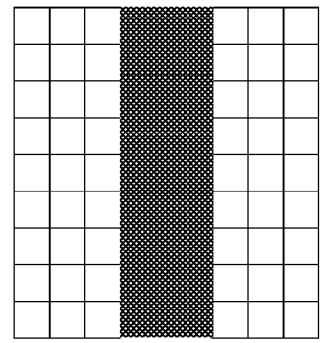
Figure 2G:
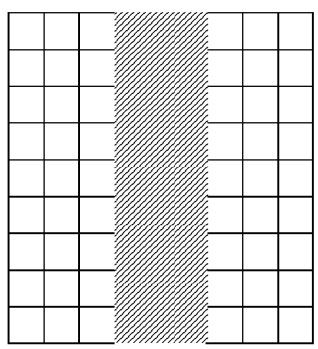
Figure 2H:
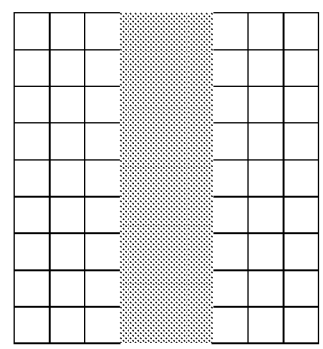

As mentioned earlier, the present invention is directed to encoding and decoding color barcodes that have increased data capacity by using various combinations of colors and shapes in the barcodes to encode and decode digital data, and computer program product that causes a data processing apparatus to perform these methods. Since two more dimensions (color and shape) are used in addition to the traditional two dimensional barcodes, the new color barcodes of the present invention may be referred to as four dimensional (4D) barcodes.

In a barcode, the majority of the cells are for data encoding. Each of the data encoding cell consists of a rectangular or square array of pixels (e.g., M*N pixels). According to the exemplary embodiments shown in FIGS. 1(a) through 1(j), the array of pixels in each data cell is arranged in such a way that it combine color and shapes in various configuration and orientations to encode digital data.

As shown in FIGS. 1(a) through 1(j), for example, if the cell consists of N*N (e.g., N=9) pixels, a number of shapes or configurations (combined with there orientations) may be used to encode different digital data. Of course the number of usable shapes depends on the cell array size and the quality of reproducing and capturing devices for a specific application, and a minimum requirement on N depends on the number of shapes to be used.

In addition to use the shapes/configurations and their orientations to encode different digital data, various colors can be used for each of the shape/configuration to increase the data capacity of the barcode. For example, for the vertical rectangular shape shown in FIG. 1(j), different colors may be used, each representing a different data value, as shown in FIGS. 2(a) through 2(h).

As shown in FIGS. 2(a) through 2(h), for the same vertical rectangular shape in a cell, eight (8) different colors (C, M, Y, K, R, G, B and Gray, respectively) may be used to encode different digital data. Of course in addition to CMYK and RGB color space, other color spaces such as Lab, JCH, LUV, etc. color spaces may also be used. To utilize the primary colors used in most color printing devices, in general the CMYK primaries are chosen first before other colors are considered. The colors should be as far away as possible in the CMYK color space.

If the number of shapes is S and the number of colors is C, each data cell can have S*C combinations, which is equivalent to $\log_2(S*C)$ bits per cell. In addition, more than one gradation levels of each color may be used in the barcode cells as well. As a result, the number of combinations of shapes and colors (and optionally their gradation levels) used in the data cells of a barcode are dramatically increased, so that the data capacity of the barcode is significantly enhanced.

Constraints can be imposed on the combinations of shapes and colors to reduce errors. For example, one restraint may be that a shape can only be combined with a subset of colors, or vice versa. This will essentially function as a built-in error correction mechanism. Alternatively, Error Correction Code (ECC) can be used during data encoding to improve reliability.

In a barcode that implements the present invention embodiments, the rectangular (or square) area of the barcode is divided into an array of cells (e.g., U*V cells), and each cell itself consists of a rectangular (or square) array of pixels (e.g., M*N pixels). A certain number of cells on the corners may be used as locator cells (for decoding purposes), and certain other cells located adjacent to the locator cells may be used as color reference cells, which help the detection of colors during the decoding process as colors tend to drift during printing and imaging processes.

Further, the size of the barcode (i.e., U*V) can also be coded in cells near the locators to help decoding the barcode. Optionally, additional locators and reference cells may be place at the center of the barcode too if the barcode size is too large, and shape reference cells may also be added near the color reference cells. Optionally, white spaces may be added between cells to reduce color interferences between neighboring cells to improve the accuracy of the decoding. The maximum data capacity of such a barcode without the optional Error Correction Code and white space is:

Max. capacity per sq. inch=$(dpi/N\_pix)^2 *R\_data\_ratio*\log_2(S*C)$ where dpi (dot per inch) is the pixel resolution, R_data_ratio is the number of data cells divided by the total number of cells in a given area, S is the number of shapes, and C is the number of colors used in the barcode.

Figure 3:
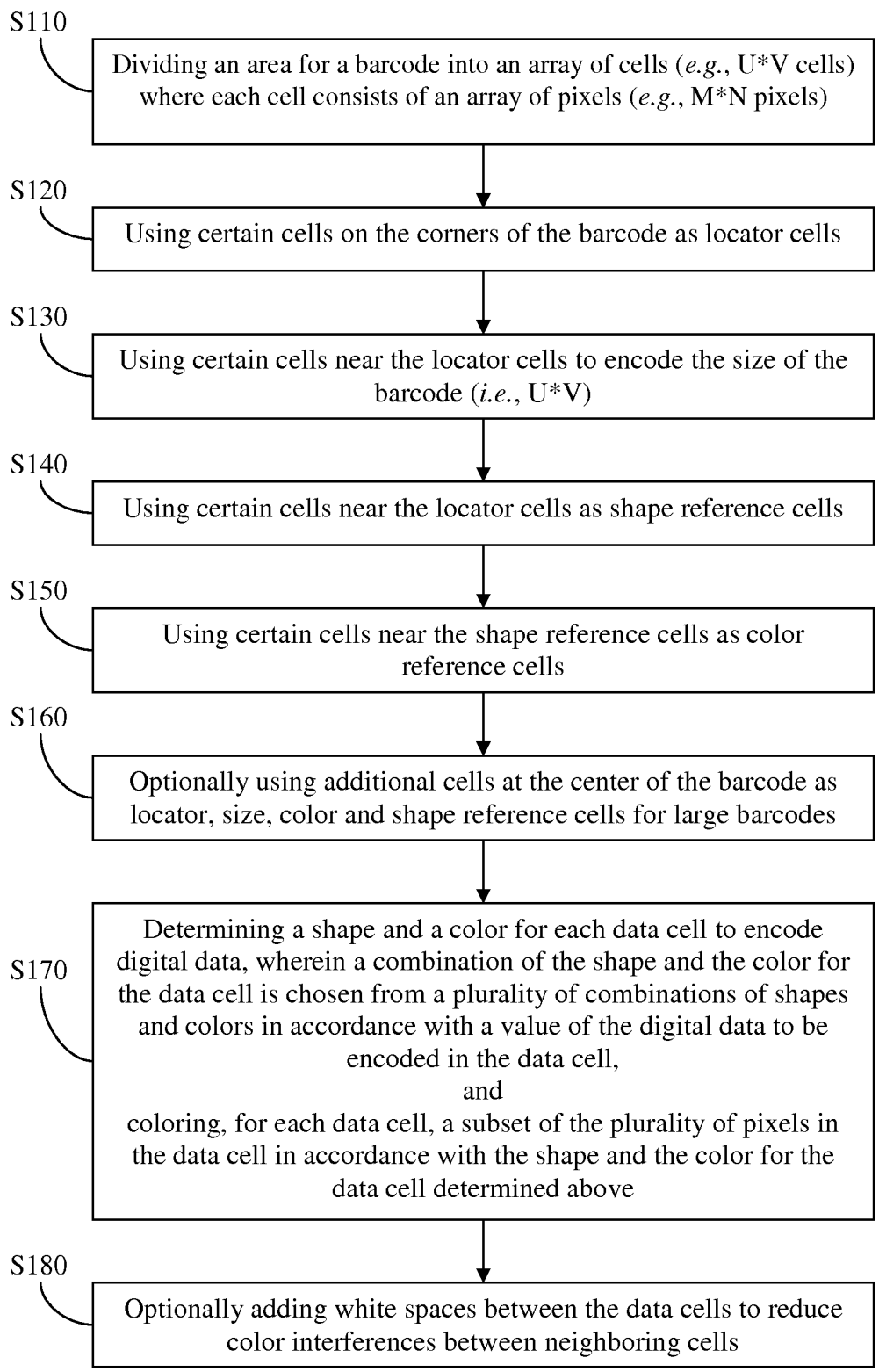
FIG. 3 is a flowchart illustrating the steps of encoding a color barcode according to an exemplary embodiment of the present invention.

Referring to FIG. 3, there are illustrated the basic steps of providing, producing, generating, rendering or encoding a barcode (either by a computer, printer or electronic transmission) in accordance with an exemplary embodiment of the present invention. Each step of this encoding process is implemented by executing a color barcode rendering software program, which may reside on a computer connected to one or more printers or on a printer itself (such as the computer 12 and printer 14 shown in FIG. 5(a)), or on a color barcode generating device. The program is executed by the central processing unit (CPU) of the computer or by the data processor or processing unit of the printer or device. Data or other information used when executing the encoding program may be stored in and retrieved from a memory or storage unit of the computer, printer or device.

In Step 110, a rectangular (or square) area for a barcode is divided into an array of cells (e.g., U*V cells). Each cell consists of a rectangular (or square) array of pixels (e.g., M*N pixels).

In Step 120, certain cells on the corners of the area for the barcode are used as locator cells. For instance, the cells at the four corners of the barcode are colored black in L shapes to be used as the locator cells. The orientation of the barcode can be specified by a corner locator that is different from the other three corner locators.

In Step 130, certain cells near the locator cells are colored to encode the size of the barcode to be generated (i.e., U*V).

In Step 140, certain cells near the locator cells are colored in accordance with shapes possibly used in the barcode as shape reference cells;

In Step 150, certain cells near the shape reference cells are colored in accordance with colors possibly used in the barcode as color reference cells;

In Step 160, additional cells at the center of the area for the barcode are redundantly colored to be used as locator cells, barcode size cells, color reference cells, and shape reference cells if the barcode size is too large. However, the Step 160 is optional.

In Step 170, the other cells are colored to be used as data encoding cells to encode digital data. Certain pixels of each cell may form one of many shapes or configurations, and each shape or configuration may be colored with one of many colors. The different shape and color combinations can represent different data values, respectively. In a certain embodiment, the digital data may be divided into subsets of the digital data, and each of the subsets may be encoded to a corresponding one of the different shape and color combinations, with referring to a look-up-table defining an encoding rule from digital values to shape and color combinations, respectively.

In Step 180, white spaces are optionally added between the data cells to reduce color interferences between neighboring cells.

Figure 4:
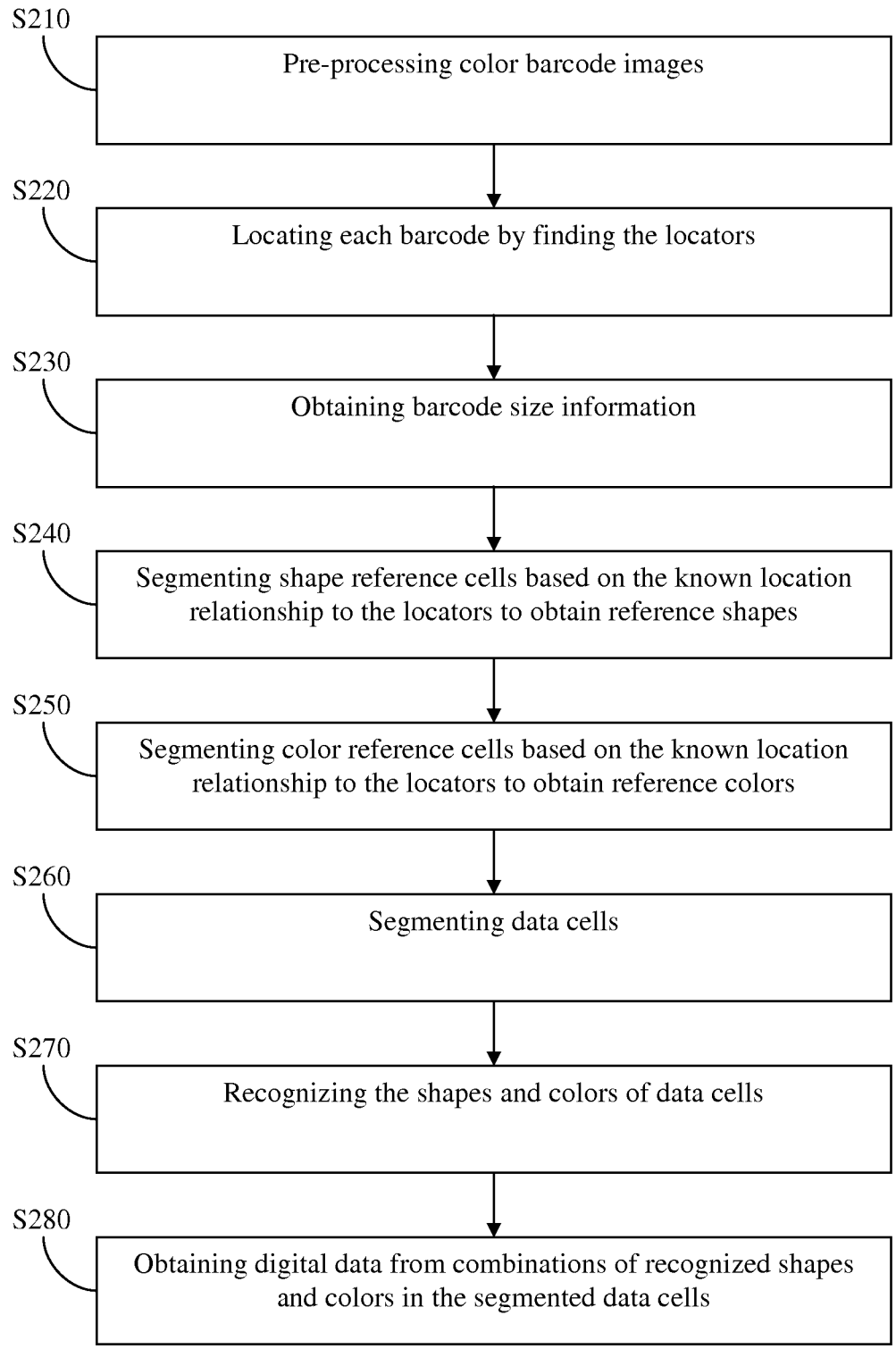
FIG. 4 is a flowchart illustrating the steps of decoding a color barcode according to an exemplary embodiment of the present invention.

Referring to FIG. 4, there are illustrated the basic steps of capturing, scanning or decoding a barcode (either from scanners, cameras or electronic transmission) in accordance with an exemplary embodiment of the present invention. Each step of this decoding process is implemented by executing a color barcode decoding software program, which may reside on a computer connected to one or more scanners or on a scanner itself (such as the computer 12 and scanner 16 shown in FIG. 5(b)), or on a color barcode decoding device. The program is executed by the central processing unit (CPU) of the computer or by the data processor or processing unit of the scanner or device. Data or other information used when executing the decoding program may be stored in and retrieved from a memory or storage unit of the computer, scanner or other imaging device.

In Step 210, color barcode images are pre-processed, such as de-noising, distortion correction (perspective correction may be needed for camera-captured images). Various conventional techniques can be employed for this Step.

In Step 220, each barcode are located by finding the locators. For example, L shaped locators at the corners of the barcode, and the locator at the center of the barcode when available, may be located by pattern recognition methods utilizing their color (black or white), shape and location (corners for L locators). The orientation of the barcode is identified according the corner locator that is different from the other three corner locators. A de-skew step may need to be carried out.

In Step 230, barcode size information is obtained. For instance, such barcode size information may be extracted from the corresponding barcode size cells, as explained in Step 130 and 160 of FIG. 3.

In Step 240, shape reference cells are segmented based on the known location relationship to the locators to obtain reference shapes.

In Step 250, color reference cells are segmented based on the known location relationship to the locators to obtain reference colors.

In Step 260, data cells are segmented. If white spaces are added between cells, the segmentation can be simply carried out by finding white spaces across the whole barcode in horizontal and vertical direction. The barcode size can be used to facilitate this process. If no white spaces are added between cells, horizontal and vertical edge segments can be detected, and the edge segments are further linked or fitted to a grid. Again, the barcode size can be used to facilitate this process.

In Step 270, the shapes and colors of data cells are recognized. In the case of shapes, shape features (for example, translation and scaling invariant image moments) can be utilized for shape recognition. Or if reference shapes are used, template matching methods can be used as well (such as cross-correlation or Hausdorff distance). In the case of colors, the distances between the target color and the references colors can be used for color recognition. Alternatively this step of shape and color recognition can also use a combined feature vector representation of shapes and colors.

In Step 280, digital data is obtained from the segmented data cells based on the recognition of the shapes and colors of the data cells. Each unique combination of a shape and a color may represent a unique data item or a data value, and from interpreting a combination of a certain shape and a certain color the digital data represented by the combination can be obtained. In a certain embodiment, the shape and color combinations of data cells are referred to a look-up-table to reproduce the digital data. The look-up-table used in this Step may have a reverse relationship in terms of input and output from the look-up-table used in the Step 170.

The process of encoding and decoding barcodes may be performed by barcode rendering and decoding software programs, respectively. A color barcode renderer program may reside on a computer connected to one or more printers, or on a printer itself. A color barcode decoder program may reside on a computer connected to one or more scanners/cameras, or on a scanner/camera itself.

The methods described above may be implemented by a computer software program running on a computer, a printer, a scanner/camera, and/or other data processing apparatus.

Figure 5A:
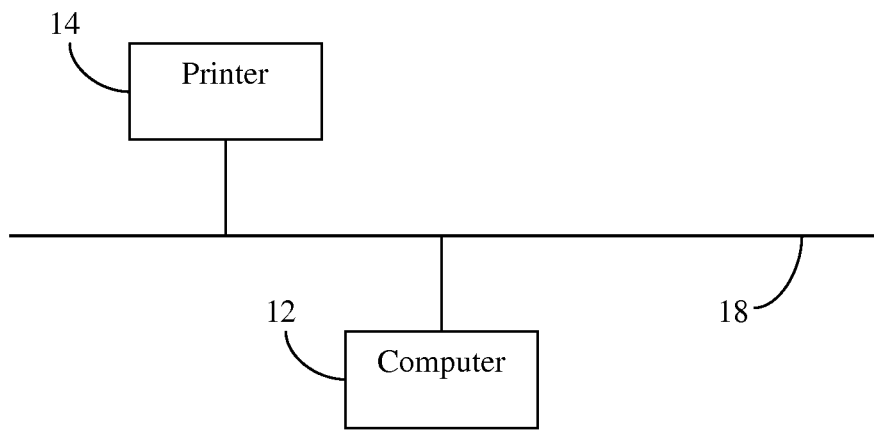
FIG. 5(a) is a schematic diagram illustrating a system in which one exemplary embodiment of the present invention may be implemented.
Figure 5B:
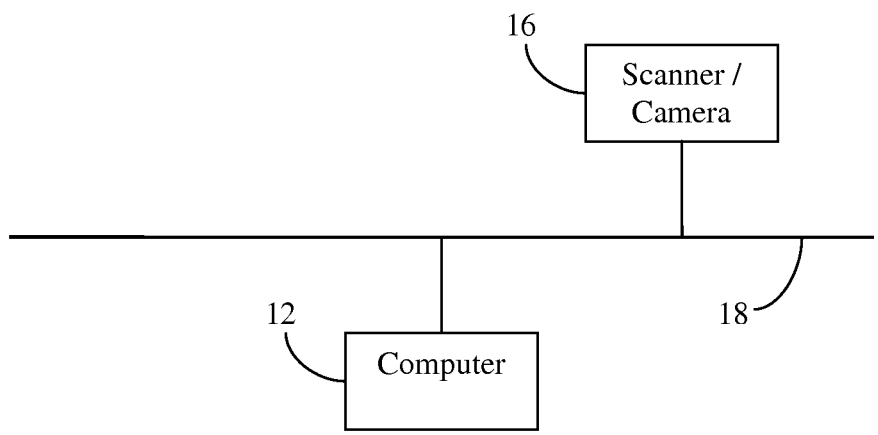
FIG. 5(b) is a schematic diagram illustrating a system in which another exemplary embodiment of the present invention may be implemented.

Referring to FIGS. 5(a) and 5(b), there are illustrated exemplary systems in which the methods of the present invention may be implemented. In the exemplary embodiment shown in FIG. 5(a), the system may include a computer 12 and a printer 14 connected to each other by a network or other wired or wireless communication link 18. One embodiment of the invention is a computer loaded with a program for encoding a 4D color barcode in accordance with the embodiments of the present invention. Another embodiment of the invention is a printer having a processor and a read-only memory (ROM) loaded with a program for rendering a 4D color barcode in accordance with the embodiments of the present invention. Alternatively the printer 14 may be a stand alone printer not connected with the computer 12. In the other exemplary embodiment shown in FIG. 5(b), the system may include a computer 12 and a scanner/camera 16 connected to each other by a network or other wired or wireless communication link 18. One embodiment of the invention is a computer loaded with a program for decoding a 4D color barcode in accordance with the embodiments of the present invention. Another embodiment of the invention is a scanner/camera having a processor and a ROM loaded with a program for capturing a 4D color barcode in accordance with the embodiments of the present invention. Alternatively the scanner 16 may be a stand-alone scanner/camera not connected with the computer 12. In many practical applications, the encoding and decoding process may be carried out at different locations, and the printer 14 and scanner 16 (or some other imaging device, such as camera) do not necessarily communicate with each other at the same time. For example, a common practice today is that advertisers print barcodes next to their product commercials on fliers, and customers can simply read the barcodes with their smart phone cameras to obtain additional information about the products encoded in the barcodes.

In addition, although in many instances the exemplary embodiments of the present invention for increasing barcode capacity is implemented in a print-scan loop, it is understood that computers, printers and/or scanners can each individually function to perform certain part of the exemplary process of the present invention method. For example, a computer may be used to generate/encode and/or decode a barcode, a printer may be used generate and/or print a barcode, while a scanner or a camera may be used to read and/or decode a barcode. From a practical application viewpoint, it is not necessary to have all of the devices connected in a network or connected to each other. Furthermore, multifunction printers (MFP) and All-In-One (AIO) devices may used in place of the printer or scanner for generating/capturing barcodes It will be apparent to those skilled in the art that various modification and variations can be made in the method and apparatus of the present invention without departing from the spirit or scope of the invention. Thus, it is intended that the present invention cover modifications and variations that come within the scope of the appended claims and their equivalents.

What is claimed is:

1. A method for encoding digital data in a color barcode having a plurality of cells including data cells, comprising the steps of:
   (a) determining a shape to be formed inside each data cell and a color for the shape for encoding digital data, wherein a combination of the shape and the color for the data cell is chosen from a plurality of combinations of shapes and colors in accordance with a value of the digital data to be encoded in the data cell; and
   (b) coloring, for each data cell, a subset of the plurality of pixels in the data cell to form the shape determined for the data cell in step (a) with the color determined for the data cell in step (a), wherein the shape formed inside each data cell is defined by the subset of the plurality of pixels in the data cell colored by the color for said each data cell, such that each data cell for encoding digital data has only one shape, and said one shape is colored by only one color, wherein all data cells have a same size of N by M pixels of which one subset of pixels forming only one shape that is colored by only one color to make a unique combination of shape and color depending on the digital data encoded therein, and data cells having different values of digital data encoded therein have different combinations of shape and color which are determined by the value of digital data encoded in each data cell.

2. The method of claim 1, further comprising the step of forming a plurality of locator cells.

3. The method of claim 1, further comprising the step of forming a plurality of shape reference cells.

4. The method of claim 1, further comprising the step of forming a plurality of color reference cells.

5. The method of claim 1, further comprising the step of forming a plurality of cells to encode a size of the barcode.

6. The method of claim 1, wherein the plurality of combinations of shapes and colors include colors of the CYMK, RGB, Lab, JCH or LUV color spaces.

7. The method of claim 1, wherein the plurality of combinations of shapes and colors include gray colors.

8. The method of claim 1, further comprising the step of applying one or more gradation levels to at least one of the plurality of combinations of shapes and colors.

9. The method of claim 1, further comprising the step of adding one or more white pixels between adjacent data cells.

10. The method of claim 1, further comprising the step of imposing one or more constraints on one or more of the plurality of combinations of shapes and colors.

11. A method for decoding a color barcode, comprising the steps of:
    (a) segmenting a plurality of data cells in the color barcode;
    (b) recognizing a shape formed by a subset of pixels inside each data cell, and a color of the shape, wherein the shape formed inside each data cell is defined by the subset of the plurality of pixels in the data cell colored by the color for said each data cell, such that each data cell for encoding digital data has only one shape, and said one shape is colored by only one color, wherein all data cells have a same size of N by M pixels of which one subset of pixels forming only one shape that is colored by only one color to make a unique combination of shape and color depending on the digital data encoded therein, and data cells having different values of digital data encoded therein have different combinations of shape and color which are determined by the value of digital data encoded in each data cell; and
    (c) obtaining digital data from a combination of the recognized shape and color in each data cell.

12. The method of claim 11, further comprising the step of pre-processing the color barcode to de-noise and correct distortion.

13. The method of claim 11, further comprising the step of locating the plurality of data cells in the color barcode.

14. The method of claim 11, further comprising the step of determining the size of the color barcode.

15. The method of claim 11, further comprising the step of retrieving a shape reference for the color barcode.

16. The method of claim 11, further comprising the step of retrieving a color reference for the color barcode.

17. The method of claim 11, wherein step (b) further comprises the step of recognizing shape by utilizing shape features.

18. The method of claim 11, wherein step (b) further comprises the step of recognizing shape by matching shape templates.

19. The method of claim 16, wherein step (b) further comprises the step of recognizing color by comparing distance between the recognized color and the reference color.

20. The method of claim 11, wherein step (b) uses a combined feature vector representation of shapes and colors.

* * * * *